UNITED STATES PATENT OFFICE.

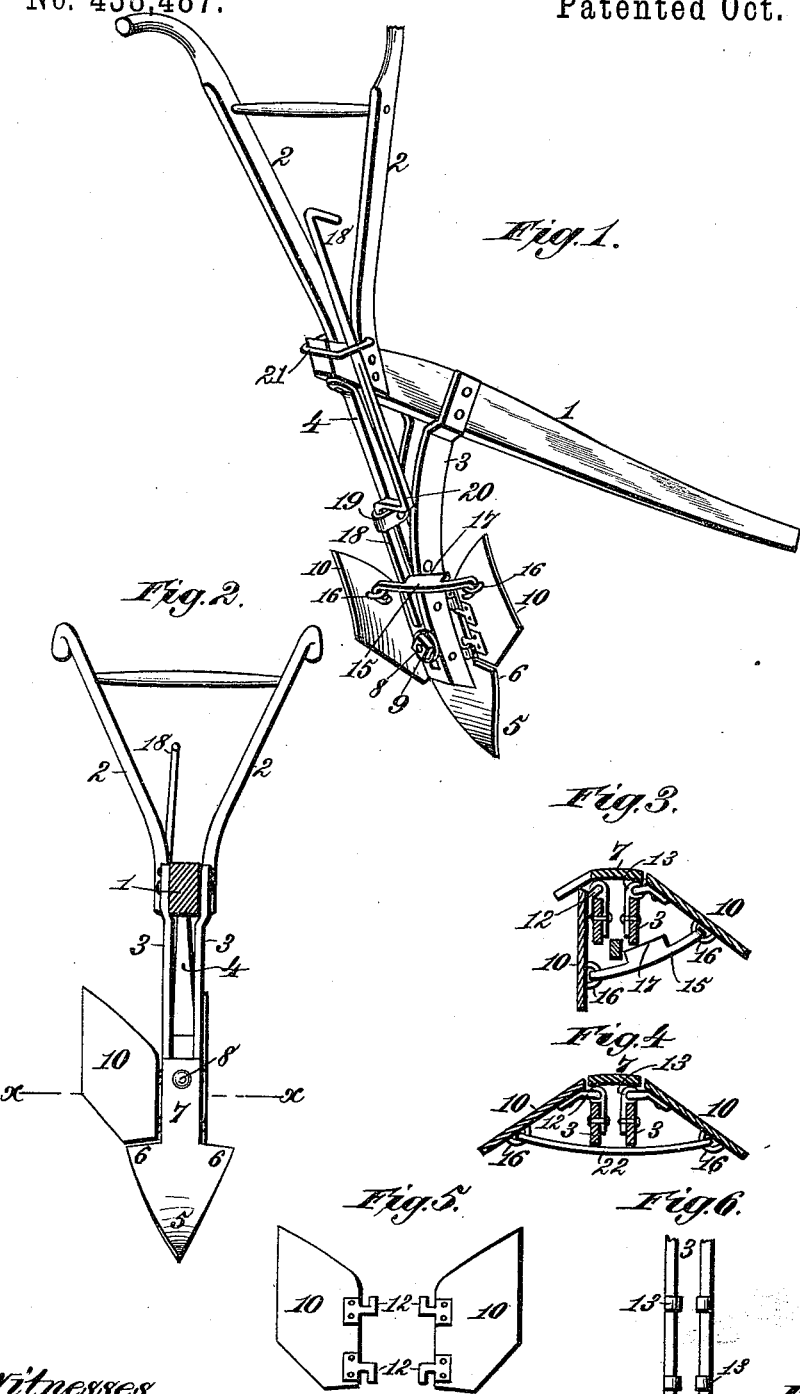

WILLIAM J. PIRKLE, OF CUMMING, GEORGIA.

PLOW.

SPECIFICATION forming part of Letters Patent No. 438,487, dated October 14, 1890.

Application filed January 23, 1890. Serial No. 337,835. (No model.)

*To all whom it may concern:*

Be it known that I, WILLIAM J. PIRKLE, a citizen of the United States, residing at Cumming, in the county of Forsyth and State of Georgia, have invented new and useful Improvements in Plows, of which the following is a specification.

My present invention relates to reversible or turning plows of the class ordinarily used in hillside plowing, and the purpose thereof is to provide a light, extremely simple, inexpensive, and easily and quickly operated plow of said type in which the mold-boards may be alternately extended and drawn in to act as mold-board and landsides succesively, whereby a light, strong, cheap, and serviceable plow is provided, suitable for hillside and other kinds of plowing, and which may be converted from a landside reversible plow to a double-turner, or vice versa. It is also one purpose of my invention to provide a simple attachment for ordinary plows, whereby they may be rendered reversible at small expense.

The invention consists in the several novel features of construction and new combinations of parts hereinafter fully set forth, and then definitely pointed out in the claims following this specification.

To enable others skilled in the art to practice my said invention, I will proceed to describe the same in detail, reference being had to the accompanying drawings, in which—

Figure 1 is a perspective view taken from the rear. Fig. 2 is a front elevation with the beam in section. Fig. 3 is a transverse sectional view on the line $x\ x$, Fig. 2. Fig. 4 is a similar view on the same line of section, showing the wings spread by a long stay to convert the plow into a double-turner. Fig. 5 is a detail view of the wings. Fig. 6 is a view of the lower portion of the standard.

In the said drawings, the reference-numeral 1 designates the beam of the plow, to which are attached the handles 2 in any suitable manner. Depending from the plow-beam at the proper point is the standard 3, which is braced rearwardly by a diagonal or inclined brace 4, having its end inserted between the parallel members of the standard and riveted or bolted thereto. Upon the lower portion of the standard is mounted the point 5, which is provided with divergent lateral wings 6, and a central bar or plate 7, which lies upon the front of the standard and receives a heel-bolt 8, passing through the slot in the latter and fastened by a nut 9 turned upon its rearward end.

The numeral 10 denotes the mold-boards, which are similar to each other, being substantially trapezoidal in shape. Upon or near one of the edges of these mold-boards I mount pintles 12, which are riveted to the metal plates. These pintles are received within eyes or loops 13, which project from the forward edges of the standard, the upper loops being removable to permit the insertion of the pintles. These bearings may be made in any preferred manner; but I consider that shown in the drawings the best, strongest, and most durable. The plow-point is drawn by its attaching heel-bolt 8 down upon and over said pivotal bearings and the eyes in which they have support, thereby affording them protection from wear by contact with earth and stones as the plow cuts through the soil.

The mold-boards 10 are connected together by means of a rigid yoke 15, the extremities of which hook into eyes 16, projecting from the rear faces of the mold-boards. Upon the middle portion of this yoke is formed or mounted a cam projection 17, having such length that when either mold-board is turned down flat against the standard or in the position of the landside the corresponding end of the cam will be in position to be engaged by a key 18, having adjustment in one or more cleats or keepers 19, mounted on the rear brace 4. This key consists of a strong bar running in said keeper parallel with the brace and in rear of and close to the same, its body portion being bent laterally at 20, to enable it to pass to the end of the beam and be extended upward within convenient reach of the hand of the plowman. The bar is guided and supported by a second keeper or loop 21, mounted on the beam, and is operated to release the reversible mold-boards by simply sliding it upward until its point clears the shoulder of the cam plate or projection 17. It can be operated by simply lifting it high enough to release the mold-boards and then swinging the latter with the foot and dropping the key, which locks by its own weight. This construction forms a light, extremely simple, but strong, durable, and effective plow, which may be manufactured at very low price. It may be applied as an attachment to an ordinary plow, and thus the purchaser may enjoy all the benefits of the invention without the expense of purchasing a complete plow.

By removing the yoke 15, which is easily done by detaching the wings from their pivotal supports or bearings and replacing it by a long yoke or stay 22, the wings or mold-boards may be spread to their widest capacity, and the plow may then be used as a double-turner for opening large furrows. When this is done, the key 18 may be removed by detaching the keeper 21 and withdrawing it from the cleat.

For one-horse plows I may make the connections between the wings or blades and the part to which they are hinged by simply punching or drilling openings near the edges of the mold-boards, which will receive hooks or other suitable bearings on the plow-standard. This form of construction is very cheap, and for small plows is equally durable and effective.

What I claim is—

1. In a reversible plow, the combination, with a plow-beam and standard, of a pair of swinging mold-boards hinged to the standard, a rigid yoke having its ends pivotally attached to the mold-boards, whereby the latter swing in unison, and a guided vertically-sliding key for directly engaging different parts of the rigid yoke to hold either mold-board extended, substantially as described.

2. In a reversible plow, the combination, with a standard and a plow-point mounted thereon, of swinging mold-boards pivotally mounted on each side of said standard and pivotally connected by a rigid yoke having a cam plate or projection, and a key movable in one or more keepers and arranged to engage either end of the cam-plate, substantially as described.

3. In a reversible plow, the combination, with a standard and a point, of the swinging mold-boards having eyes riveted in or near one edge and engaging pivotal bearings mounted on the standard, a rigid yoke having pivotal engagement at its ends with eyes on the back of said mold-boards, and a sliding bar moving in a keeper on a rearward brace and engaging opposite shoulders or projections on the yoke, substantially as described.

In testimony whereof I have affixed my signature in presence of two witnesses.

WILLIAM J. PIRKLE.

Witnesses:
C. D. DANIELL,
J. A. GARRETT.